United States Patent [19]

Jurgens

[11] Patent Number: 5,032,955
[45] Date of Patent: Jul. 16, 1991

[54] MUD FLAP MOUNTED VEHICLE REFERENCE LIGHTING SYSTEM

[76] Inventor: J. Ben Jurgens, R.R. 2, Box 152A2, Buffalo, Mo. 65622

[21] Appl. No.: 546,577

[22] Filed: Jun. 29, 1990

Related U.S. Application Data

[63] Continuation-in-part of Ser. No. 153,666, Feb. 8, 1988, Pat. No. D. 309,724.

[51] Int. Cl.5 .............................................. B60Q 1/30
[52] U.S. Cl. ...................................... 362/61; 362/80; 362/82; 362/64
[58] Field of Search ...................... 362/61, 81, 82, 64, 362/80, 83, 83.3

[56] References Cited

U.S. PATENT DOCUMENTS

| | | | |
|---|---|---|---|
| 1,454,465 | 5/1923 | Becker | 362/61 |
| 1,842,800 | 1/1932 | Rhodes | 362/61 |
| 2,081,899 | 6/1937 | Bridge | 362/81 |
| 2,086,524 | 7/1937 | Clark | 362/80 |
| 2,553,187 | 5/1951 | Goolsby | 362/61 |
| 4,024,497 | 5/1977 | Ruppel et al. | |
| 4,413,839 | 11/1983 | McCain | 362/80 |

FOREIGN PATENT DOCUMENTS

| | | | |
|---|---|---|---|
| 243510 | 2/1961 | Australia | 362/83 |
| 825357 | 12/1951 | Fed. Rep. of Germany | 362/82 |
| 3501030 | 7/1986 | Fed. Rep. of Germany | 362/82 |
| 217374 | 6/1924 | United Kingdom | 362/61 |
| 978596 | 12/1964 | United Kingdom | 362/80 |

Primary Examiner—Ira S. Lazarus
Assistant Examiner—Y Quach
Attorney, Agent, or Firm—Litman, McMahon & Brown

[57] ABSTRACT

A lighting system for over-the-road tractor-trailers or other large vehicles includes a plurality of lamps, mounted on a rear mud flap and directed downward and to the side, so as to cast a light pattern in an illuminated region on the road surface which is visible to the driver. Each lamp is mounted within a parabolic reflector and has a louver bolted on the bottom of the light to direct the light along a selected axis so as to effectively position the pattern at the most desirable location to allow the driver to see and control the rear of the truck. The driver is able to determine where the rear of the vehicle is by glancing at his side-mounted rear-view mirror and seeing the light pattern on the road surface. This facilitates maneuvering of the truck in tight spaces and in passing on the highway.

20 Claims, 2 Drawing Sheets

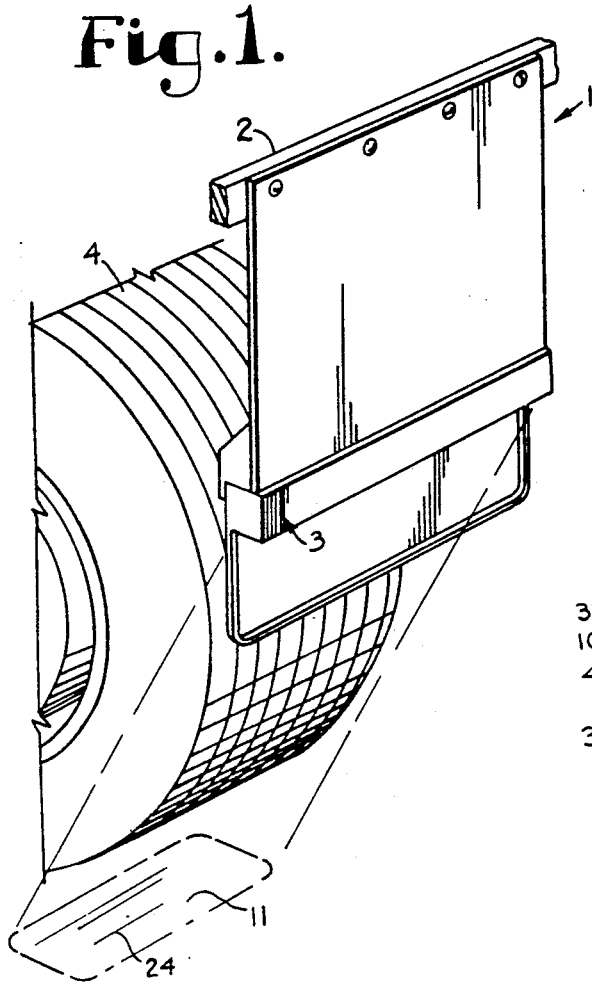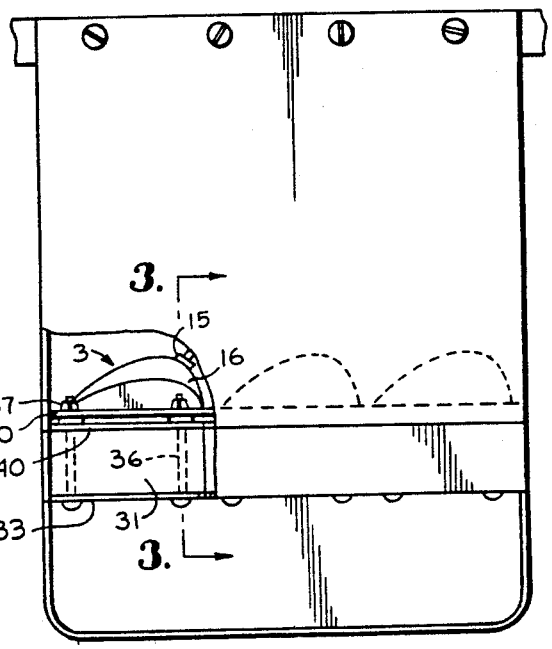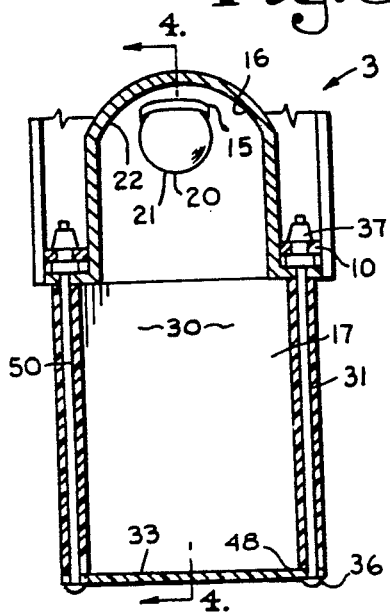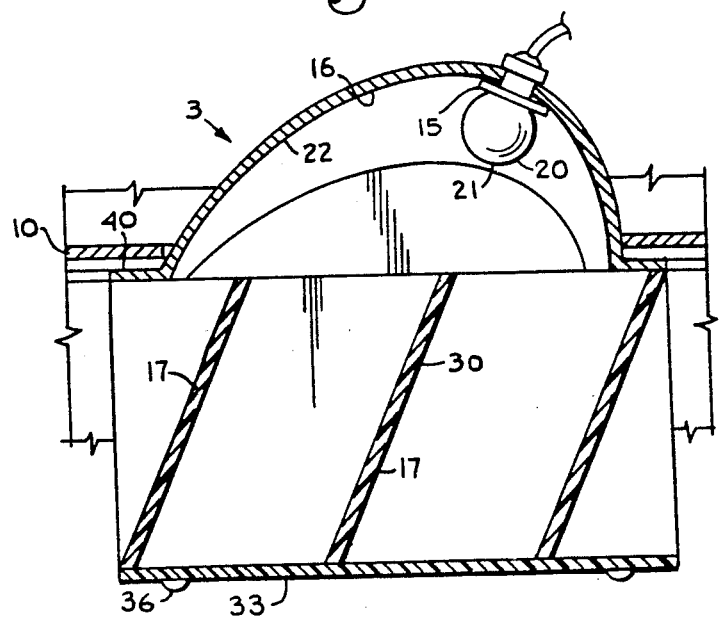

MUD FLAP MOUNTED VEHICLE REFERENCE LIGHTING SYSTEM

CROSS-REFERENCE TO RELATED APPLICATION

The present application is a continuation-in-part of design patent application Serial No. 07/153,666, filed Feb. 8, 1988, now Pat. No. D.309,724 entitled LIGHTED MUD FLAP.

BACKGROUND OF THE INVENTION

The present invention relates to a lighting system for providing the driver of a semi tractor-trailer or other large vehicle a reference location of rear trailer wheels relative to a roadway and surrounding structure by projecting a light pattern onto the roadway surface coincident with the rear wheels of the vehicle.

As is commonly known, drivers of semi tractor-trailers often have problems in determining how far to the rear their trailer extends and especially where their rear wheels are located with respect to curbing, corners of buildings and the like. This is due to the fact that the tractor-trailer combination is lengthy, resulting in a depth perception problem and that the driver cannot have a wide angle rear-view mirror mounted within the tractor cab, as do most automobiles. It is crucial, when a driver is attempting to maneuver the tractor-trailer rig in close quarters and when attempting to pass another vehicle on the highway, for the driver to be able to determine the rearward extent of his trailer. The problem is exaggerated at night and during bad weather conditions due to the spray mist that such a large vehicle creates, due to its contact with the wet road. The mist surrounds the vehicle and further limits visibility.

Due to these hazards, it is a common practice within the trucking industry for a passed truck to flash his vehicle headlights at the passing truck, as a sign that it is safe to move back into the same lane. Such a practice is not universal, however, and drivers of automobiles rarely give such signals. This makes it more crucial for the truck driver to have a reference when passing an automobile, especially since this is a more frequent occurrence and more dangerous because the relatively small size of the automobile increases the depth perception problem.

As a consequence, the need exists within the trucking industry for a reliable method of visually indicating to a semi tractor-trailer driver just how far to the rear his trailer extends relative to surrounding vehicles or objects.

It is also important to provide an apparatus for providing a lighted visual spot with the apparatus providing a relatively bright light that is not subject to occlusion by mud or the like thrown rearward by the rear tires.

OBJECTS OF THE INVENTION

Therefore, the objects of the present invention are: to provide a lighting system to give the driver of a tractor trailer rig a visible reference as an indication of the rearward extent and especially the location of the rear wheels of a large trailer; to provide such a lighting system which makes a pattern on the road surface coincident with a known location on the trailer in order to provide such an indication; to mount such a lighting system on the rear mud flaps to reduce the likelihood of mud occluding the system; to direct the light via a reflecting mirror and a series of louvers onto the road surface so that at least a portion of the light pattern is visible through the side rear-view mirror of the cab; to provide a series of lenses underneath the louvers to prevent water and mud from being splashed up onto the lights themselves; to provide such a lighting system which is inexpensive to produce and simple to use; to provide such a lighting system which is readily removable; to provide such a lighting system which is modular in nature, allowing individual components to be replaced; and to provide a method of indicating to a driver of such a vehicle the rearward extent of a known location on the vehicle by projecting a recognizable light pattern onto the road surface to aid in maneuvering the vehicle.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary perspective view of the rear of a mud flap mounted lighting system according to the present invention showing placement of the lighting system on a vehicle mud flap and the pattern cast upon the road surface.

FIG. 2 is an enlarged and fragmentary rear elevational view of the lighting system mounted on the vehicle mud flap with a portion broken away to show structure of a lamp thereof and showing additional lamps in phantom lines.

FIG. 3 is an enlarged and fragmentary side elevational view of the system showing one of the lamps, taken generally along line 3—3 of FIG. 2.

FIG. 4 is an enlarged and fragmentary rear elevational view of the system showing one of the lamps, taken along line 4—4 of FIG. 3.

DETAILED DESCRIPTION OF THE ILLUSTRATED EMBODIMENT OF THE INVENTION

Figure 5:
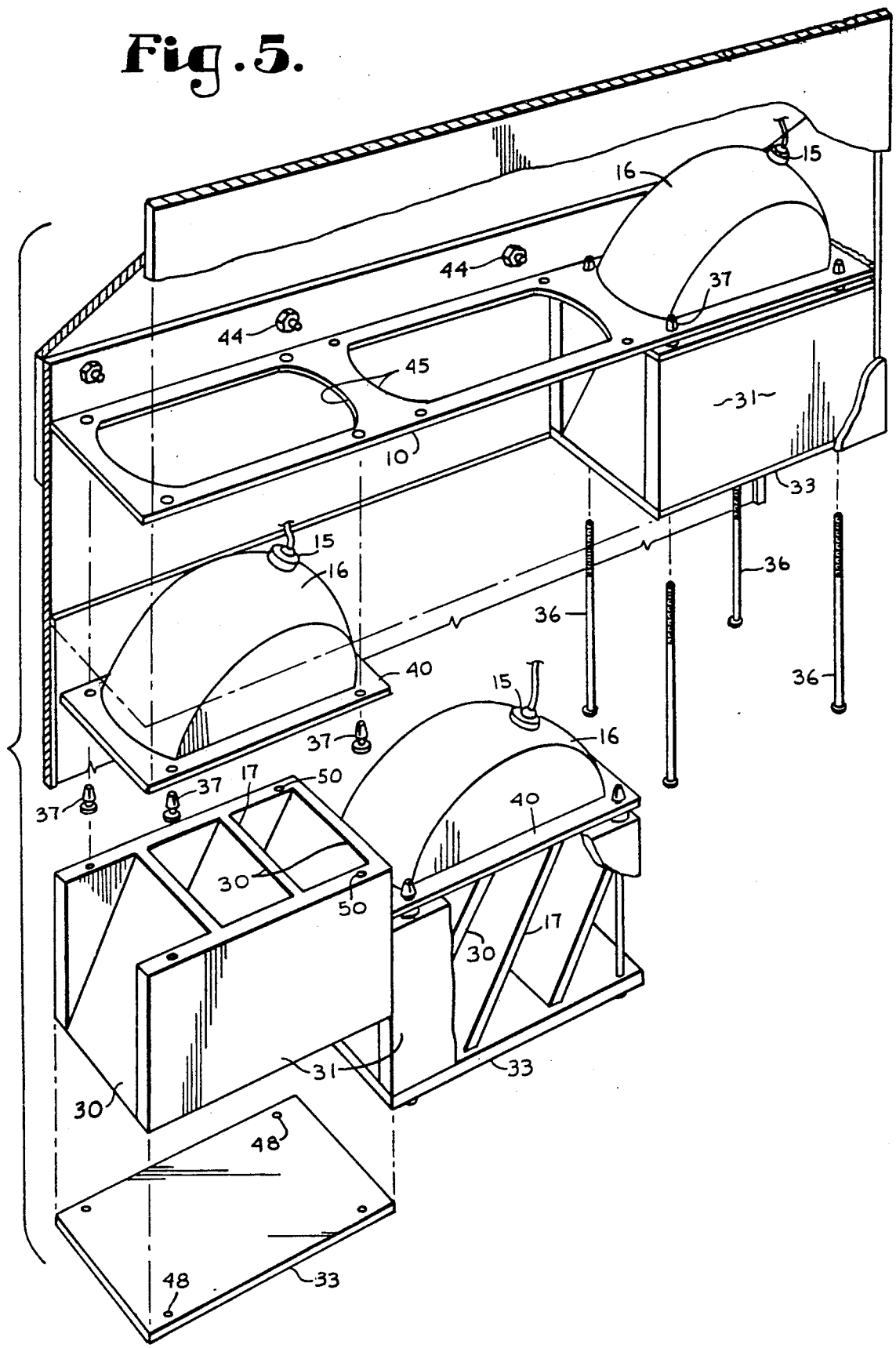
FIG. 5 is an enlarged and exploded perspective view of the system showing the lamps and showing mounting details of the lamps, including reflectors, louvers, and lenses of the lamps on a plate which is, in turn, mounted on the mud flap.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a rear mounted mud flap 1 for use on a tractor-trailer 2 (fragmentarily seen in FIG. 1) or other large vehicle and incorporating a lighting system 3 in accordance with the present invention. FIG. 1 shows the mud flap 1 mounted behind a left rear tire 4, as is conventional.

The lighting system 3 is mounted on a downwardly directed horizontal plate 10 that is, in turn, mounted on the mud flap 1. The lighting system 3 is oriented such that it casts a pattern, illustrated as lighted region 11 in FIG. 1, upon the road surface. As shown, the lighted region 11 extends at least partly to the lefthand side of the tire 4 so as to be visible to the driver through a conventional side-mounted rear-view mirror (not shown) of the vehicle 2.

The lighting system 3 is better illustrated in FIGS. 2, 3, and 4 which show details of one of a plurality of lamps 15, three in the illustrated embodiment, within the lighting system 3, including an associated reflector 16 and directional louvers structure 17. As shown in FIG. 2, each lamp 15 includes an individual light 20. Each light 20 in the system comprises a halogen bulb 21, mounted within a respective reflector 16 here illustrated as a parabolic mirror 22, the axis of each mirror 22 being angled to direct the light toward the roadway, as is illustrated in FIG. 1. The focal length of each mirror 22 is generally equal to the distance between the light 20 and a road surface 24 at that angle. This results in the sharply defined lighted region 11 at the road surface 24.

Mounted beneath each parabolic mirror 22 is one of the associated louver structures 17, best illustrated in FIG. 4. Each louver structure 17 includes a plurality of slats 30 which are angled at the same angle as the axis of the mirror 22 such that light from the lamp is projected onto and forms the desired lighted region 11 on the roadway 24. The slats 30 are encircled by an integral and vertically extending wall 31. Finally, a protective lens 33 is mounted underneath each of the louver structures 17 and positioned to keep dirt or debris from entering the louver structure 17. The entire lighting system 3 is bolted to the plate 10, via a plurality of bolts 36 and nuts 37, the bolts 36 extending through a respective lens 33, louver structure 17, and flanges 40 around a respective parabolic mirror 22. Bolts 36 and nuts 37 are preferably made of rust resistant material such as plastic or stainless steel.

FIG. 5 is a disassembled or exploded view of the entire lighting system 3, including three separate lamps 15. As illustrated in FIG. 5, the plate 10 is bolted onto the remainder of the mud flap 1 via a series of bolts and nuts 44, also preferably of rust resistant material. FIG. 5 also illustrates the modular nature of the lighting system 3. Note that plate 10 has three cut-outs 45 designed to receive the parabolic mirrors 22 of the reflectors 16 with the mirror flanges 40 abutting the underneath side of the plate 10. The bolts 36 pass through apertures 48 drilled in each lens 33 and similarly aligned apertures 50 drilled through each louver structure 17, the flanges 40 and plate 10. The nuts 37 are threaded onto the bolts 36 to secure the entire lighting system 3 to the plate 10. The entire lighting system 3 is designed so that individual components can be selectively replaced without replacing others.

It is contemplated that the lamps 15 should be a color that is different from either tail/brake lights (not shown) of the vehicle 2 or headlamps (not shown), so that the driver can better distinguish the pattern of the lighted region 11 from those which may be cast by taillights or other vehicle lamps. For example, orange or yellow would be desirable, and would also permit the lighted region 11 to be more readily seen during daylight hours. The use of halogen bulbs 21 that are well known to emit a higher intensity beam than standard resistance bulbs, also contributes to better pattern visibility.

Although the pattern of the lighted region 11 is shown in FIG. 1 as being generally rectangular, it should be apparent that any desired shape can be accomplished by changing the shape of the louver structure 17 and/or the parabolic mirrors 22.

While the lighting system 3 illustrated herein incorporates three lamps 15 on each mud flap 1, it should be apparent that any desired number of such lamps including a single lamp could be used. It should also be apparent that, while the lamp system 3 is preferentially mounted onto the rear of the mud flap 1, it could be mounted on any structure near the rear of the vehicle which would allow the pattern of the lighted region 11 to be directed at the desired location on the road surface 24, preferably behind a structure to block mud thrown by the tires 4.

While the lighting system 3 has been described as usable with a tractor-trailer, vehicles other than tractor-trailers such as cars or pickups pulling travel trailers and large panel trucks, etc. may utilize a lighting system in accordance with the invention.

In use, the driver of a vehicle 2 equipped with the subject lighting system 3, would observe the pattern of the lighted region 11 cast upon the road surface 24 by the lamps 15 in relation to a vehicle which is being passed on the highway, or in relation to a curb, loading ramp, dock, or other stationary object around which the vehicle 2 is maneuvering. By observing the relative positions of the light pattern of the region 11 and the other vehicle or stationary object, the driver is able to determine when to merge his vehicle 2 back into traffic, or when to turn his vehicle so as to avoid the stationary objects.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for providing an indication to the driver of a vehicle of the position of a known location near a rear-most portion of the vehicle relative to a road surface comprising:
   (a) high intensity lighting means adapted for mounting on the vehicle near the rear of the vehicle; and
   (b) means directing and focusing the light form said lighting means and for forming a light pattern to focus and shine the light such that said pattern is adapted to be seen on the road surface and so as to cast said pattern in a selected location relative to the vehicle with sufficient intensity to be visible to the driver of the vehicle, said pattern being coincident with a fixed location at the rear of the vehicle.

2. The apparatus according to claim 1 wherein:
   (a) the lighting means is attached to a mud flap adapted to be mounted behind a rear wheel of the vehicle.

3. The apparatus according to claim 1 wherein:
   (a) the lighting means comprises a plurality of individual lamps; and
   (b) said apparatus includes a lens for protecting said lighting means and said light directing means from dirt and debris.

4. The apparatus according to claim 3 wherein:
   (a) each of said lamps includes a reflecting mirror.

5. The apparatus according to claim 4 wherein:
   (a) each of said mirrors is of a parabolic shape and angled such that light emanating from a respective lamp casts a pattern on the road surface visible to said driver, said mirror having a focal length generally equal to the distance between the lamp and a planar road surface when so angled.

6. An apparatus for providing an indication to the driver of a vehicle of the position of a known location near a rear-most portion of the vehicle relative to a road surface comprising:
   (a) lighting means adapted for mounting on the vehicle near the rear of the vehicle; said lighting means comprising a plurality of individual lamps; and
   (b) means directing the light from said lighting means so as to be adapted to shine onto the road surface so as to cast a pattern in a lighted region in a selected location relative to the vehicle onto the road surface visible to the driver of the vehicle, said pattern being coincident with a fixed location at the rear of the vehicle; said means including a louver mounted beneath each of said lamps; each of said louvers comprising a plurality of slats; each of said slats being angled downward and toward the side of the vehicle so as to cast said light pattern onto said road surface visible to said driver.

7. The apparatus according to claim 6 wherein:
   (a) a lens is positioned beneath each of said louvers to prevent debris from entering said louvers.

8. The apparatus according to claim 6 wherein:
   (a) the color of said light pattern is different from normal headlamp and brake/tail light colors.

9. The apparatus according to claim 8 wherein:
   (a) said color is orange.

10. The apparatus according to claim 8 wherein:
    (a) said color is yellow.

11. An apparatus for providing an indication to the driver of a vehicle of the position of a known location near a rear-most portion of the vehicle relative to a road surface comprising:
    (a) lighting means adapted for mounting on the vehicle near the rear of the vehicle; said lighting means comprising a plurality of individual lamps; each of said lamps including a reflecting mirror; each of said mirrors having a parabolic shape and angled such that light emanating from a respective lamp casts a pattern on the road surface visible to said driver, each of said mirrors having a focal length generally equal to the distance between the respective lamp and a planar road surface when so angled; and
    (b) means directing the light from said lighting means so as to be adapted to shine onto the road surface so as to cast a pattern in a lighted region in a selected location relative to the vehicle onto the road surface visible to the driver of the vehicle, said pattern being coincident with a fixed location at the rear of the vehicle; said means including a louver mounted beneath each said lamp; each of said louvers comprising a plurality of slats; said slats being angled downward and toward the side of the vehicle so as to direct light from a respective lamp at the same angle as a respective mirror so as to cast said light pattern onto said road surface visible to said driver.

12. The apparatus according to claim 11 wherein:
    (a) a lens is positioned beneath each of said louvers to prevent debris from entering said louvers.

13. The apparatus accordion to claim 12 wherein:
    (a) said lighting means are mounted onto a plate adapted to be attached to said vehicle; said plate being adapted to be oriented generally parallel to said road surface.

14. The apparatus according to claim 12 wherein:
    (a) said lighting means is attached to a plate via a plurality of removable nuts and bolts, each of said bolts extending through bores in a respective lens, a respective louver, a flange surrounding a respective mirror and said plate, such that each assembly of said lenses, said louvers, said mirrors, and said lamps is individually removable.

15. An apparatus according to claim 14 wherein:
    (a) said bolts and nuts are constructed of a rust resistant material.

16. An apparatus according to claim 14 wherein:
    (a) said plate has a plurality of cut-out portions each of said portions being of a size and orientation to receive one of said parabolic mirrors; and the flange surrounding each said mirror abutting against an underside of said plate.

17. An apparatus according to claim 14 wherein:
    (a) said plate is attached to a mud flap mounted behind rear wheels of the vehicle.

18. The apparatus according to claim 11 wherein:
    (a) said lamps are in side-by-side relationship to one another and aligned such that said pattern is generally rectangular and positioned such that said pattern is positioned at least partly adjacent the vehicle behind a rear tire during operation.

19. A method of providing a diver of a vehicle having a side-mounted rear-view mirror with an indication of the rearward extent of the vehicle relative to a road surface, comprising the steps of:
    (a) cooperatively mounting a lamp in conjunction with a parabolic reflector, a directional louver structure and a protective lens therebeneath near the rear of said vehicle;
    (b) focusing light from said lamp with said reflector and louver structure so as to form a pattern; and
    (c) directing said pattern of light with sufficient intensity from said lamp onto the road surface to form a light pattern on the road surface coincident with a known position of the rear of said vehicle and visible to said driver through the side-mounted rear-view mirror.

20. A method according to claim 19 wherein:
    (a) said mounting step includes mounting said lamp onto a mud flap attached behind the rear wheels of said vehicle.

* * * * *